US011853371B1

(12) United States Patent
Zhou et al.

(10) Patent No.: US 11,853,371 B1
(45) Date of Patent: Dec. 26, 2023

(54) LOGGING INFORMATION DESCRIBING A TYPE OF EVENT OCCURRING IN A MOBILE APPLICATION RECEIVED VIA AN SDK INCORPORATED INTO MOBILE APPLICATION CODE OF THE MOBILE APPLICATION

(71) Applicant: Meta Platforms, Inc., Menlo Park, CA (US)

(72) Inventors: Li Zhou, Campbell, CA (US); Liang Xu, Bellevue, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 943 days.

(21) Appl. No.: 16/050,951

(22) Filed: Jul. 31, 2018

(51) Int. Cl.
| | |
|---|---|
| *G06F 9/44* | (2018.01) |
| *G06F 9/445* | (2018.01) |
| *G06F 7/00* | (2006.01) |
| *H04W 8/22* | (2009.01) |
| *H04W 8/18* | (2009.01) |
| *G06F 16/9535* | (2019.01) |
| *H04L 67/025* | (2022.01) |
| *G06N 20/00* | (2019.01) |
| *G06F 16/907* | (2019.01) |
| *G06F 16/955* | (2019.01) |
| *G06F 16/9032* | (2019.01) |
| *G06F 40/20* | (2020.01) |

(52) U.S. Cl.
CPC ........ *G06F 16/9535* (2019.01); *G06F 16/907* (2019.01); *G06F 16/90332* (2019.01); *G06F 16/9558* (2019.01); *G06F 40/20* (2020.01); *G06N 20/00* (2019.01); *H04L 67/025* (2013.01)

(58) Field of Classification Search
CPC .. G06F 16/9535; G06F 40/20; G06F 16/9558; G06F 16/907; G06F 16/90332; G06N 20/00; H04L 67/025
USPC .......................................................... 706/12
See application file for complete search history.

(56) References Cited

U.S. PATENT DOCUMENTS

| | | | |
|---|---|---|---|
| 8,997,081 B1 * | 3/2015 | Manion | ..................... G06F 8/71 717/168 |
| 9,317,812 B2 * | 4/2016 | Kabiljo | .................. G06Q 30/02 |
| 9,372,898 B2 * | 6/2016 | Li | ..................... G06F 16/24578 |
| 9,553,918 B1 * | 1/2017 | Manion | .................. G06F 16/40 |
| 9,953,036 B2 * | 4/2018 | Mackenzie | ........... G06F 16/178 |

(Continued)

*Primary Examiner* — Kevin T Bates
*Assistant Examiner* — Golam Mahmud
(74) *Attorney, Agent, or Firm* — Fenwick & West LLP

(57) ABSTRACT

An online system receives information including a description of an event occurring in a mobile application and user identifying information associated with a user of the mobile application associated with the event via an SDK incorporated into the mobile application code of the mobile application. The online system determines whether the description corresponds to information maintained in the online system describing types of events capable of occurring in the mobile application. If the description corresponds to information describing a type of event capable of occurring in the mobile application, the online system logs the type of event in association with the user identifying information. Otherwise, the online system predicts a type of event corresponding to the event occurring in the mobile application based at least in part on the information received at the online system and logs the predicted type of event in association with the user identifying information.

24 Claims, 3 Drawing Sheets

(56) References Cited

U.S. PATENT DOCUMENTS

| | | | | |
|---|---|---|---|---|
| 9,977,824 | B2* | 5/2018 | Agarwal | G06F 16/951 |
| 9,990,441 | B2* | 6/2018 | Hazra | G06F 40/205 |
| 10,535,005 | B1* | 1/2020 | Badr | G06F 21/44 |
| 10,733,254 | B2* | 8/2020 | Marra | H04L 51/214 |
| 10,776,757 | B2* | 9/2020 | Fang | G06F 16/93 |
| 10,896,380 | B2* | 1/2021 | Martine | G06N 20/00 |
| 2009/0164926 | A1* | 6/2009 | Boyle | G06F 16/9535 |
| | | | | 715/764 |
| 2009/0216639 | A1* | 8/2009 | Kapczynski | G06Q 30/0207 |
| | | | | 705/14.1 |
| 2014/0156566 | A1* | 6/2014 | Kabiljo | G06N 20/00 |
| | | | | 706/12 |
| 2015/0156061 | A1* | 6/2015 | Saxena | H04L 67/34 |
| | | | | 715/733 |
| 2016/0019460 | A1* | 1/2016 | Li | G06F 16/24578 |
| | | | | 719/318 |
| 2016/0247165 | A1* | 8/2016 | Ryabchun | G06Q 30/0201 |
| 2016/0292283 | A1* | 10/2016 | Vishwanath | G06F 16/9535 |
| 2017/0031741 | A1* | 2/2017 | Seigel | G06F 11/0709 |
| 2017/0098236 | A1* | 4/2017 | Lee | G06Q 10/067 |
| 2017/0116161 | A1* | 4/2017 | Stein | G06Q 50/01 |
| 2017/0116339 | A1* | 4/2017 | Stein | G06F 16/24578 |
| 2017/0178007 | A1* | 6/2017 | Yu | G06N 5/02 |
| 2017/0293648 | A1* | 10/2017 | Villalva | G06F 16/9535 |
| 2018/0032861 | A1* | 2/2018 | Oliner | G06Q 10/0637 |
| 2018/0314689 | A1* | 11/2018 | Wang | G10L 15/1822 |
| 2018/0314915 | A1* | 11/2018 | Cai | G06N 5/022 |
| 2018/0329993 | A1* | 11/2018 | Bedadala | G06F 16/90332 |
| 2019/0026765 | A1* | 1/2019 | Sommer | G06Q 30/0277 |
| 2019/0043085 | A1* | 2/2019 | Berger | G06F 16/9535 |

* cited by examiner

LOGGING INFORMATION DESCRIBING A TYPE OF EVENT OCCURRING IN A MOBILE APPLICATION RECEIVED VIA AN SDK INCORPORATED INTO MOBILE APPLICATION CODE OF THE MOBILE APPLICATION

BACKGROUND

This disclosure relates generally to online systems, and more specifically to logging information describing a type of event occurring in a mobile application received via an SDK incorporated into mobile application code of the mobile application.

As mobile devices (e.g., smartphones, tablets, etc.) have become increasingly popular, so have mobile applications (e.g., mobile gaming applications, mobile shopping applications, mobile social networking applications, etc.) capable of running on the mobile devices. Various types of events may occur in mobile applications. Events occurring in mobile applications may correspond to user actions performed in the mobile applications. For example, events occurring in mobile applications may include status updates in mobile social networking applications, achievements in mobile gaming applications, purchases in mobile shopping applications, etc.

Online systems may receive information describing events occurring in mobile applications via software development kits (SDKs) incorporated into the mobile application code of the mobile applications. For example, an online system may receive a description of an event occurring in a mobile application expressed in natural language text via an SDK incorporated into the mobile application code of the mobile application. In some cases, it may be desirable for online systems to log information describing events occurring in mobile applications. For example, suppose that an online system logs information describing each event occurring in a mobile application and user identifying information (e.g., usernames, IP addresses, etc.) associated with users of the mobile application associated with the events (e.g., users who subscribed to receive notifications from the mobile application, users who provided a positive rating for the mobile application, etc.). In this example, based on the user identifying information, the online system may identify users of the mobile application who also are users of the online system. Continuing with this example, the online system may then analyze the logged information so that content that is more relevant to these users may be presented and/or recommended to them by the online system.

However, since application developers of different mobile applications may describe the same types of events differently, it may be difficult for online systems to log information describing these events in a consistent manner. For example, suppose that an online system receives information from different mobile applications describing a type of event corresponding to an update to user profile information. In this example, if the description of the event is expressed in natural language text, information received from one mobile application may be expressed as "profile update," information received from another mobile application may be expressed as "user profile updated," and information received from yet another mobile application may be expressed as "update to profile." Continuing with this example, although the information received from each mobile application describes the same type of event, since the descriptions differ from each other, the online system may log these events as different types of events. As a result, inconsistencies among logged events of the same type may make it difficult for online systems to subsequently interpret and analyze logged information describing events occurring in mobile applications.

SUMMARY

Online systems may receive information describing events occurring in mobile applications via software development kits (SDKs) incorporated into the mobile application code of the mobile applications. It may be desirable for online systems to log information describing events occurring in mobile applications. However, since different descriptions may be used by application developers of different mobile applications to describe the same types of events, it may be difficult for online systems to log information describing the same types of events occurring in mobile applications in a consistent manner.

To resolve inconsistencies among information describing the same types of events occurring in mobile applications and to log the information describing these events in a more consistent manner, an online system may predict a type of event occurring in a mobile application based on information received from the mobile application and log the predicted type of event. The online system may do so by first receiving information including a description of the event occurring in the mobile application and user identifying information associated with a user of the mobile application associated with the event via an SDK that is incorporated into the mobile application code of the mobile application. The online system determines whether the description of the event corresponds to information maintained in the online system describing types of events capable of occurring in the mobile application. If the description of the event corresponds to information maintained in the online system describing a type of event capable of occurring in the mobile application, the online system logs the type of event in association with the user identifying information. If the online system determines that the description of the event does not correspond to information maintained in the online system describing a type of event capable of occurring in the mobile application, the online system predicts a type of event corresponding to the event based at least in part on the information received at the online system from the mobile application and logs the predicted type of event in association with the user identifying information.

In some embodiments, the online system may predict the type of event corresponding to the event occurring in the mobile application using a machine-learning model and/or using a set of rules. In embodiments in which the online system predicts the type of event using a machine-learning model, the online system may train the model using data associated with events that previously occurred in one or more mobile applications. The data used to train the model may include a set of keywords extracted from information describing events that previously occurred in the mobile application(s). In embodiments in which the online system predicts the type of event using a set of rules, the online system may generate the set of rules, which map keywords extracted from data associated with events that previously occurred in one or more mobile applications to different types of events.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
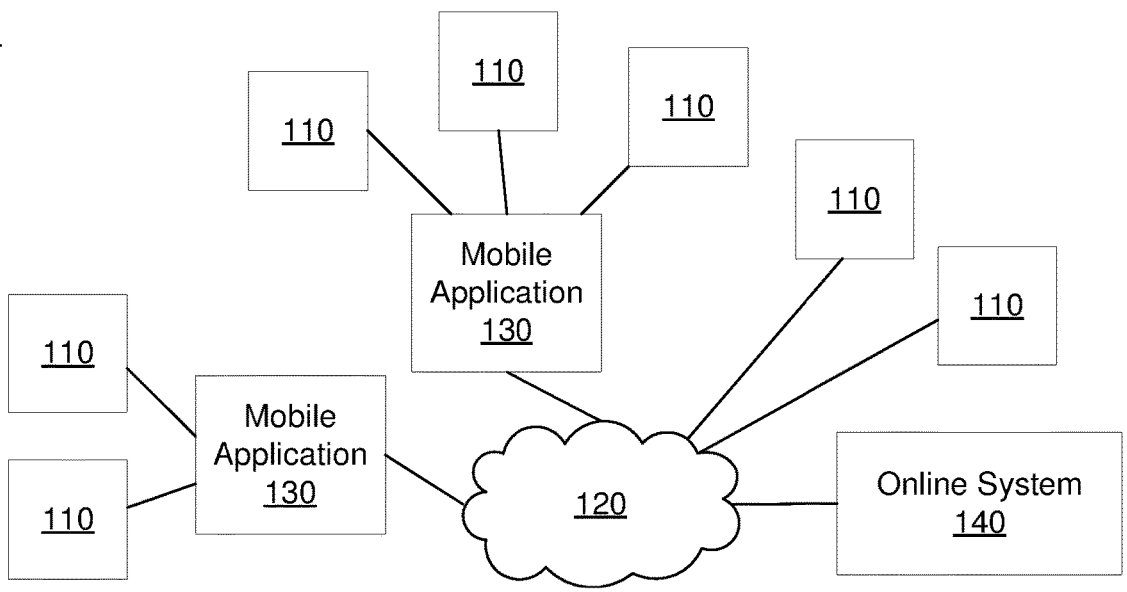
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more mobile applications 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application (e.g., a mobile application 130) allowing a user of the client device 110 to interact with the online system 140. For example, a client device 110 executes a mobile browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more mobile applications 130 running on one or more client devices 110 may be coupled to the network 120 for communicating with the online system 140, which is further described below in conjunction with FIG. 2. Examples of mobile applications 130 include mobile shopping applications, mobile social networking applications, mobile music streaming applications, mobile mapping applications, mobile browser applications, mobile messaging applications, mobile webmail applications, or any other suitable types of applications capable of running on a mobile device. A mobile application 130 may communicate information describing events occurring in the mobile application 130 to the online system 140, such as user actions performed in the mobile application 130 (e.g., status updates, gaming achievements, etc.). In one embodiment, a mobile application 130 communicates information describing events occurring in the mobile application 130 to the online system 140 via a software development kit (SDK) incorporated into the mobile application code of the mobile application 130. In other embodiments, a mobile application 130 may communicate information describing events occurring in the mobile application 130 to the online system 140 via a tracking mechanism, such as a tracking pixel embedded into content presented in the mobile application 130.

Figure 2:
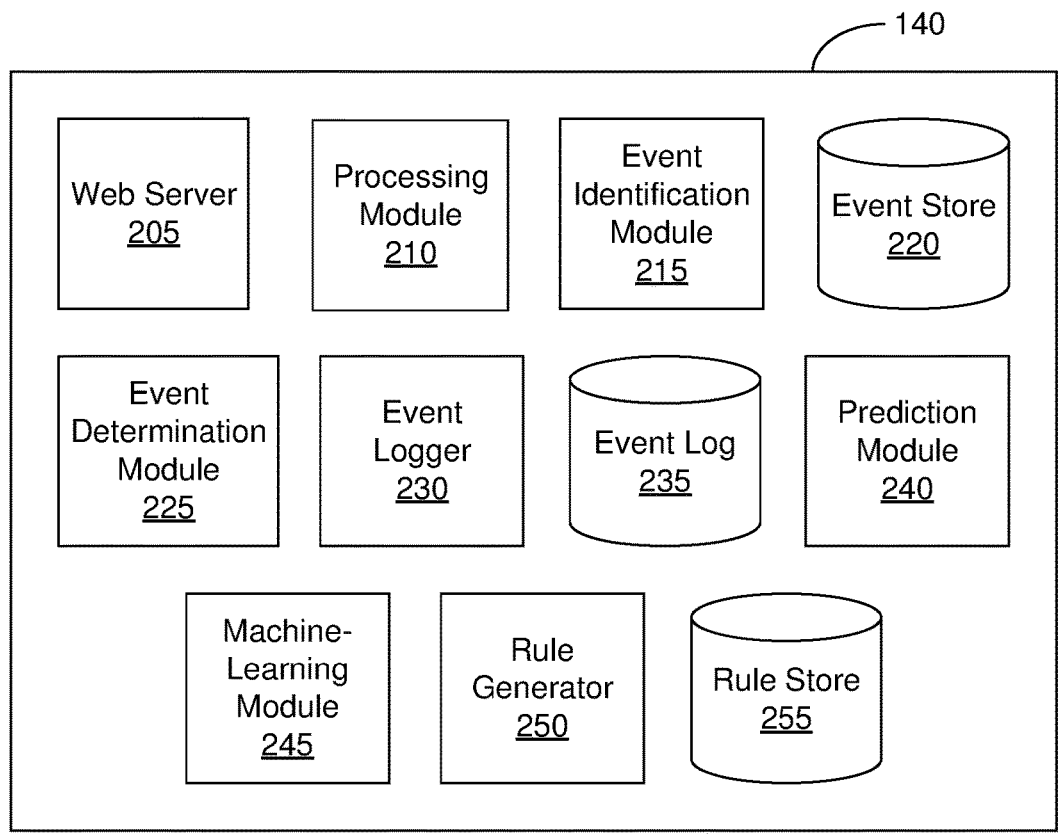
FIG. 2 is a block diagram of an online system, in accordance with an embodiment.

FIG. 2 is a block diagram of an architecture of the online system 140. The online system 140 shown in FIG. 2 includes a web server 205, a processing module 210, an event identification module 215, an event store 220, an event determination module 225, an event logger 230, an event log 235, a prediction module 240, a machine-learning module 245, a rule generator 250, and a rule store 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

The web server 205 links the online system 140 via the network 120 to the one or more client devices 110, as well as to the one or more mobile applications 130. The web server 205 serves web pages, as well as other content, such as JAVA®, FLASH®, XML and so forth. The web server 205 may receive and route messages between the online system 140 and the client device 110, for example, instant messages, queued messages (e.g., email), text messages, short message service (SMS) messages, or messages sent using any other suitable messaging technique. In some embodiments, a user may send a request to the web server 205 to upload information (e.g., images or videos) that are stored in the online system 140. Additionally, the web server 205 may provide application programming interface (API) functionality to send data directly to native client device operating systems, such as IOS®, ANDROID™, WEBOS® or BlackberryOS.

In some embodiments, the web server 205 receives (e.g., as shown in step 305 of FIG. 3) information describing an event occurring in a mobile application 130 via an SDK that is incorporated into the mobile application code of the mobile application 130. An event occurring in a mobile application 130 may correspond to a user action performed in the mobile application 130 (e.g., a subscription to receive notifications from the mobile application 130, a purchase made in the mobile application 130, etc.). Information received at the web server 205 describing an event occurring in a mobile application 130 may include a description of the event occurring in the mobile application 130. In some embodiments, information received at the web server 205 describing an event occurring in a mobile application 130 may include natural language text (e.g., in a string data type). For example, if an event occurring in a mobile application 130 corresponds to completing a registration process, a description of the event may be expressed in natural language text, such as "registration completed," "user_registration," etc.

Information received at the web server 205 describing an event occurring in a mobile application 130 also may include user identifying information associated with a user of the mobile application 130 associated with the event (e.g., a user of the mobile application 130 who performed an action in the mobile application 130 corresponding to the event). Examples of user identifying information include a unique identifier associated with a user of a mobile application 130 (e.g., a username or an email address associated with the user) or any combination of information associated with the user of the mobile application 130 that may be used to identify the user (e.g., a first name, a last name, and an IP address associated with the user).

In addition to a description of an event occurring in a mobile application 130 and user identifying information associated with a user of the mobile application 130 associated with the event, information describing the event received at the web server 205 also may include additional types of information. In some embodiments, information received at the web server 205 describing an event occurring in a mobile application 130 also may include metadata (e.g., semi-structured data) associated with the event occurring in the mobile application 130. For example, information received at the web server 205 describing an event occurring in a mobile application 130 may include a tag or other metadata identifying an object associated with the event (e.g., an item added to a shopping cart in the mobile application 130). In various embodiments, information received at the web server 205 describing an event occurring in a mobile application 130 also may include contextual information associated with the mobile application 130 and/or the event. For example, contextual information received at the web server 205 describing an event occurring in a mobile application 130 may include a deep link that launches the mobile application 130. As an additional example, contextual information received at the web server 205 describing an event occurring in a mobile application 130 may indicate an intent to perform a user action corresponding to the event occurring in the mobile application 130 (e.g., a request to begin a registration process in the mobile application 130 indicates an intent to perform the registration process). The functionality of the web server 205 is further described below in conjunction with FIGS. 3 and 4.

The processing module 210 may process (e.g., as shown in step 310 of FIG. 3) information received from a mobile application 130 describing an event occurring in the mobile application 130. In embodiments in which information received at the web server 205 from a mobile application 130 describing an event occurring in the mobile application 130 includes natural language text, the processing module 210 may process the information received from the mobile application 130 using a natural language processing technique (e.g., using a natural language understanding (NLU) algorithm). For example, the processing module 210 may process natural language text included in information received at the web server 205 from a mobile application 130 by parsing the text (e.g., into a parse tree), stemming or performing a lemmatization of each word included in the text, tagging portions of the text based on their corresponding part-of-speech, detecting a language of the text, translating the text into another language, identifying semantic relationships between words included in the text, etc. The functionality of the processing module 210 is further described below in conjunction with FIG. 3.

The event identification module 215 may identify (e.g., as shown in step 315 of FIG. 3) one or more types of events capable of occurring in a mobile application 130. The event identification module 215 may identify the types of events based on information describing the mobile application 130 included among information received from the mobile application 130. For example, suppose that information received at the web server 205 from a mobile application 130 indicates that the mobile application 130 provides a free personalized music streaming service. In this example, types of events capable of occurring in the mobile application 130 identified by the event identification module 215 may include creating an account in the mobile application 130, creating a new playlist, adding a song to a playlist, sharing a playlist, etc. Continuing with this example, since the music streaming service is free, types of events that the event identification module 215 may not identify include those involving making a purchase (e.g., providing a payment method, adding an item to a cart, etc.).

In some embodiments, information describing types of events capable of occurring in a mobile application 130 may be maintained in the event store 220 (described below). In such embodiments, the event identification module 215 may identify one or more types of events capable of occurring in a mobile application 130 by accessing information maintained in the event store 220. For example, the event store 220 may maintain one or more tables associated with one or more mobile applications 130 or one or more types of mobile applications 130 (e.g., mobile gaming applications, mobile shopping applications, etc.), in which each table describes the types of events capable of occurring in a mobile application 130 or in a type of mobile application 130. In the above example, the event identification module 215 may identify the types of events capable of occurring in a mobile application 130 by accessing a table associated with the mobile application 130 or with the type of mobile application 130. The functionality of the event identification module 215 is further described below in conjunction with FIG. 3.

The event store 220 maintains information describing various types of events capable of occurring in one or more mobile applications 130 and/or in one or more types of mobile applications 130. In some embodiments, a type of event capable of occurring in a mobile application 130 may correspond to a user action performed in the mobile application 130 by a user of the mobile application 130 (e.g., a status update to a user profile of a user of the mobile application 130). Examples of types of events capable of occurring in a mobile application 130 include completing a registration process, subscribing to a membership or a service, purchasing a good or a service, adding payment information, initiating a checkout, using a credit, reserving a good or a service, adding an item to a cart, or any other suitable types of events capable of occurring in a mobile application 130.

As described above, the event store 220 may maintain information describing types of events capable of occurring in one or more mobile applications 130 in one or more tables, in which each table describes the types of events capable of occurring in each mobile application 130. For example, the event store 220 may maintain information describing types of events capable of occurring in a first mobile gaming application in a first table, information describing types of events capable of occurring in a second mobile gaming application in a second table, information describing types of events capable of occurring in a third mobile gaming application in a third table, etc. As also described above, the event store 220 may maintain information describing types of events capable of occurring in one or more types of mobile applications 130 in one or more tables, in which each table describes the types of events capable of occurring in a type of mobile application 130. For example, the event store 220 may maintain information describing types of events capable of occurring in mobile gaming applications in a first table, information describing types of events capable of occurring in mobile social networking applications in a second table, information describing types of events capable of occurring in mobile shopping applications in a third table, etc. The event store 220 is further described below in conjunction with FIG. 3.

The event determination module 225 determines (e.g., as shown in step 320 of FIG. 3) whether a description of an event occurring in a mobile application 130 corresponds to information maintained in the event store 220 describing types of events capable of occurring in the mobile application 130. The event determination module 225 may make this determination by comparing the description of the event to the information maintained in the event store 220. For example, the event determination module 225 may compare a natural language description of an event occurring in a mobile application 130 to a list of natural language descriptions of different types of events that are capable of occurring in the mobile application 130 maintained in the event store 220 and determine whether the natural language description matches any description in the list based on the comparison. The functionality of the event determination module 225 is further described below in conjunction with FIG. 3.

In embodiments in which the event determination module 225 determines that a description of an event occurring in a mobile application 130 corresponds to information maintained in the event store 220 describing a type of event capable of occurring in the mobile application 130, the event logger 230 logs (e.g., as shown in step 325 of FIG. 3) the type of event in the event log 235 (described below). The event logger 230 may log this information in association with user identifying information associated with a user of the mobile application 130 associated with the event. For example, suppose that the event determination module 225 determines that a natural language description of an event occurring in a mobile application 130 matches a description of a type of event capable of occurring in the mobile application 130. In this example, if the type of event corresponds to completing a registration process, the event logger 230 may log information in the event log 235 indicating that the registration process was completed in association with user identifying information associated with a user of the mobile application 130 who completed the registration process.

In some embodiments, the event logger 230 may log a type of event occurring in a mobile application 130 in conjunction with metadata and/or contextual information associated with the event received at the web server 205 from the mobile application 130. Continuing with the above example, the event logger 230 may log the information in association with a time at which the user completed the registration process, an identifier associated with the mobile application 130, information describing a type of client device 110 used to complete the registration process, a deep link used by the user to launch the mobile application 130, or any other information that was included among metadata and/or contextual information received at the web server 205 from the mobile application 130.

In embodiments in which the prediction module 240 (described below) predicts a type of event corresponding to an event occurring in a mobile application 130, the event logger 230 logs (e.g., as shown in step 335 of FIG. 3) the predicted type of event in the event log 235. The event logger 230 may log this information in association with user identifying information associated with a user of the mobile application 130 associated with the event. In some embodiments, the event logger 230 also may log a predicted type of event occurring in a mobile application 130 in conjunction with metadata and/or contextual information associated with the event received at the web server 205 from the mobile application 130. For example, the event logger 230 may log a predicted type of event occurring in a mobile application 130 and user identifying information associated with a user of the mobile application 130 associated with the event in association with a time at which the event occurred, an identifier associated with the mobile application 130, information describing a geographic location of a client device 110 used by the user to access the mobile application 130 at the time that the event occurred, a deep link used by the user to launch the mobile application 130, etc. The functionality of the event logger 230 is further described below in conjunction with FIG. 3.

The event log 235 stores types of events and/or predicted types of events occurring in one or more mobile applications 130. As described above, a type of event and/or a predicted type of event occurring in a mobile application 130 may be logged in the event log 235 in conjunction with user identifying information associated with a user of a mobile application 130 associated with the event. User identifying information associated with a user of a mobile application 130 associated with an event may be included among information describing the event received at the web server 205 from the mobile application 130 (e.g., a unique identifier associated with the user or a combination of information associated with the user that may be used to identify the user). As also described above, a type of event and/or a predicted type of event occurring in a mobile application 130 may be logged in the event log 235 in conjunction with metadata and/or contextual information associated with the event received at the web server 205 from the mobile application 130.

The event log 235 may store types of events and/or predicted types of events occurring in one or more mobile applications 130 in one or more tables. For example, the event log 235 may store one or more tables of types of events occurring in multiple mobile applications 130. In this example, each table stored in the event log 235 includes multiple columns describing each type of event or each predicted type of event, such as a time at which the event occurred, information identifying the type of event or the predicted type of event, information indicating whether the type of event was predicted by the prediction module 240 (described below), user identifying information associated with a user of a mobile application 130 associated with the event, information identifying the mobile application 130 in which the event occurred, etc. The event log 235 is further described below in conjunction with FIG. 3.

In embodiments in which the event determination module 225 determines that a description of an event occurring in a mobile application 130 does not correspond to information maintained in the event store 220 describing a type of event capable of occurring in the mobile application 130, the prediction module 240 predicts (e.g., as shown in step 330 of FIG. 3) a type of event corresponding to the event occurring in the mobile application 130. The prediction module 240 may make the prediction based at least in part on information describing the event received at the web server 205 from the mobile application 130. In some embodiments, the prediction module 240 also may predict a type of event corresponding to an event occurring in a mobile application 130 based on data associated with events that previously occurred in one or more mobile applications 130. Data associated with an event that previously occurred in a mobile application 130 may include a description of the event (e.g., a string data type including natural language text describing the event), metadata associated with the event, contextual information associated with the event, and information indicating the type of event.

In various embodiments, the prediction module 240 may predict a type of event corresponding to an event occurring in a mobile application 130 using a machine-learning model that is trained based at least in part on data associated with events that previously occurred in one or more mobile applications 130. For example, suppose that a machine-learning model is trained using data associated with events that previously occurred in multiple mobile applications 130. In this example, the prediction module 240 may provide an input to the machine-learning model, in which the input corresponds to information received at the web server 205 from a mobile application 130 describing an event occurring in the mobile application 130 (e.g., a description of the event, metadata associated with the event, contextual information associated with the event, keywords extracted from the information received at the web server 205, etc.). Continuing with this example, based on the input, the machine-learning model may predict a type of event corresponding to the event occurring in the mobile application 130 and generate an output corresponding to the prediction.

In some embodiments, the prediction module 240 may predict a type of event corresponding to an event occurring in a mobile application 130 using a set of rules generated by the rule generator 250 (described below) and stored in the rule store 255 (also described below). The set of rules may map keywords extracted from data associated with events that previously occurred in one or more mobile applications 130 to various types of events. For example, suppose that a first rule stored in the rule store 255 maps a set of keywords, such as "add," "added," "adding," "cart," and "shopping," to a type of event, such as adding an item to a shopping cart and that a second rule stored in the rule store 255 maps a different set of keywords, such as "account," "create," "created," and "creating," to another type of event, such as creating an account in a mobile application 130. In this example, if an event occurring in a mobile application 130 is described as "user created account in mobile application," based on the second rule and keywords included in the description (i.e., "created" and "account"), the prediction module 240 may predict the type of event occurring in the mobile application 130 to be creating an account in the mobile application 130. The functionality of the prediction module 240 is further described below in conjunction with FIGS. 3 and 5.

In embodiments in which the prediction module 240 predicts a type of event corresponding to an event occurring in a mobile application 130 using a machine-learning model, the machine-learning module 245 may train the machine-learning model using data associated with events that previously occurred in one or more mobile applications 130. In such embodiments, for each event that previously occurred, information indicating the type of event described may correspond to a label to be predicted by the machine-learning model. For example, the machine-learning module 245 may train a machine-learning model using a set of training data, in which each instance of the set of training data includes a description of an event that previously occurred in a mobile application 130, one or more tags associated with the event, a deep link that launches the mobile application 130, and a label identifying the type of event described. In some embodiments, data associated with an event that previously occurred in a mobile application 130 may be labeled manually with the type of event described by the data.

In embodiments in which the machine-learning module 245 trains a machine-learning model that is used to predict a type of event corresponding to an event occurring in a mobile application 130, data used to train the model may include a set of keywords extracted by the machine-learning module 245 from information describing events that previously occurred in one or more mobile applications 130. For example, if data describing events that previously occurred in one or more mobile applications 130 used to train a machine-learning model includes data describing a newsletter subscription event that previously occurred in a mobile application 130, the machine-learning module 245 may extract keywords from this data (e.g., "newsletter," "subscription," etc.) and include them in the training data. In various embodiments, the keywords may correspond to attributes for each instance of the training data. In the above example, for each instance of the training data, a value of an attribute corresponding to each keyword may indicate whether the keyword is present in the instance or absent from the instance.

In embodiments in which the machine-learning module 245 extracts a set of keywords from information describing events that previously occurred in one or more mobile applications 130, the machine-learning module 245 may extract the keywords based at least in part on a weighting scheme. For example, the machine-learning module 245 may apply a term frequency-inverse document frequency (tf-idf) weighting scheme to information describing events that previously occurred in several mobile applications 130, in which the machine-learning module 245 assigns a weight to each word based on a frequency with which it appears in information describing each event and in the information describing all of the events. In this example, the machine-learning module 245 may extract keywords based on the tf-idf value computed for each word, such that the keywords correspond to words included in the information describing the events having the highest tf-idf values. The functionality of the machine-learning module 245 is further described below in conjunction with FIG. 3.

The rule generator 250 may generate a set of rules mapping keywords extracted from data associated with events that previously occurred in one or more mobile applications 130 to various types of events. For example, the rule generator 250 may extract keywords from data associated with events that previously occurred in multiple mobile applications 130. In this example, if data associated with an event that previously occurred in a mobile application 130 includes natural language text that describes a membership enrollment event, keywords extracted from this data by the rule generator 250 may include words such as "membership," "enrollment," etc. In various embodiments, the rule generator 250 may extract the keywords based at least in part on a weighting scheme (e.g., a tf-idf weighting scheme). In the above example, once the rule generator 250 has extracted the keywords, the rule generator 250 may generate a set of rules including a first rule that maps a set of keywords, such as "add," "added," "adding," "credit,""credited," "crediting," and "account," to a type of event, such as adding a credit to a user account associated with a user of the mobile application 130. In some embodiments, once the rule generator 250 has generated a set of rules mapping keywords to different types of events, the rule generator 250 may store the rules in the rule store 255 (described below). The functionality of the rule generator 250 is further described below in conjunction with FIG. 3.

The rule store 255 stores a set of rules generated by the rule generator 250 mapping keywords extracted from data associated with events that previously occurred in one or more mobile applications 130 to various types of events. One or more rules stored in the rule store 255 may be accessed by the prediction module 240 and used to predict a type of event corresponding to an event occurring in a mobile application 130. Rules stored in the rule store 255 may be stored in a table, in a list, or in any other suitable format. The rule store 255 is further described below in conjunction with FIG. 3.

Figure 3:
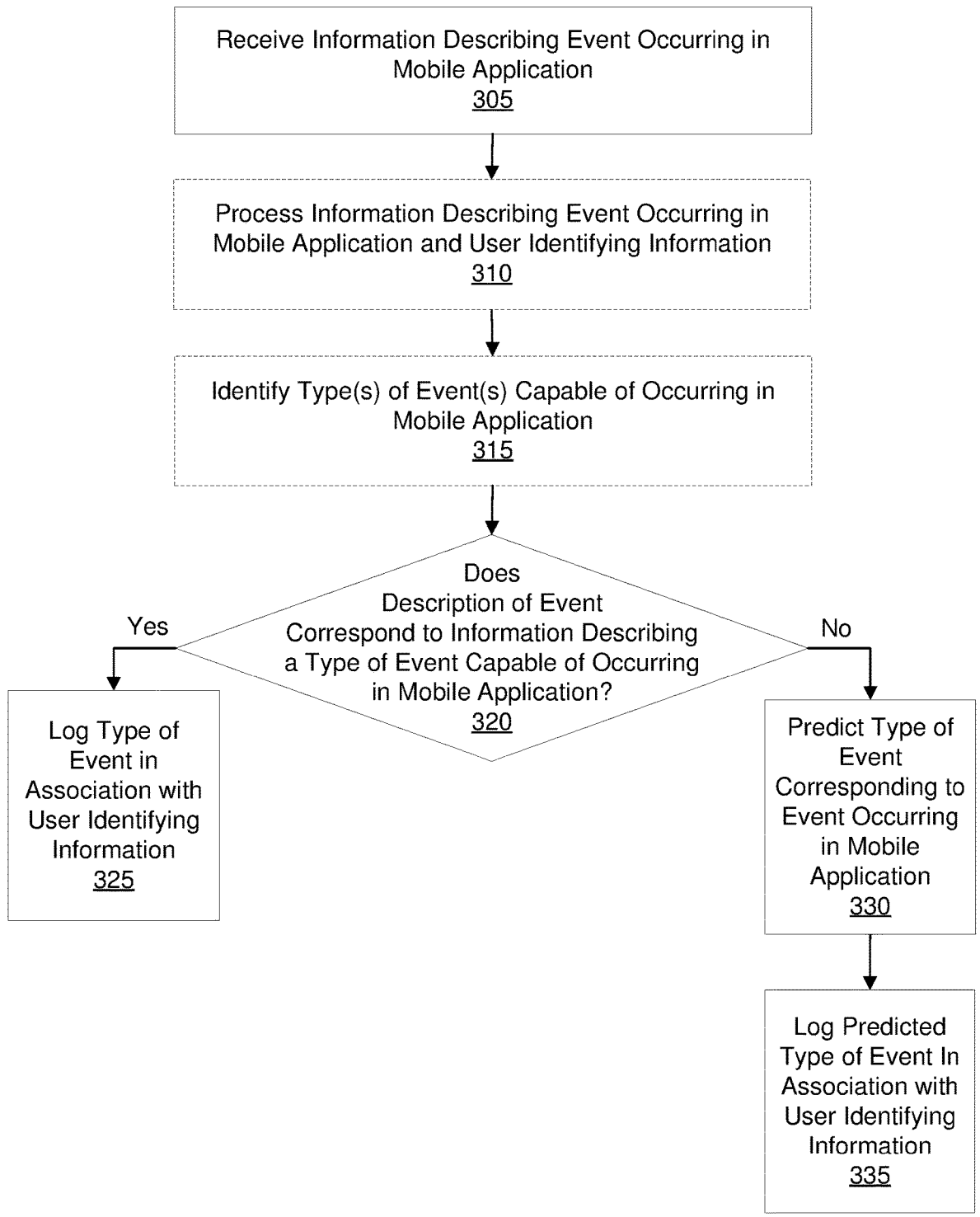
FIG. 3 is a flow chart of a method for logging information describing a type of event occurring in a mobile application received via an SDK incorporated into mobile application code of the mobile application, in accordance with an embodiment.

Logging Information Describing a Type of Event Occurring in a Mobile Application Received via an SDK Incorporated into Mobile Application Code of the Mobile Application FIG. 3 is a flow chart of a method for logging information describing a type of event occurring in a mobile application received via an SDK incorporated into mobile application code of the mobile application. In other embodiments, the method may include different and/or additional steps than those shown in FIG. 3. Additionally, steps of the method may be performed in a different order than the order described in conjunction with FIG. 3.

Figure 4:
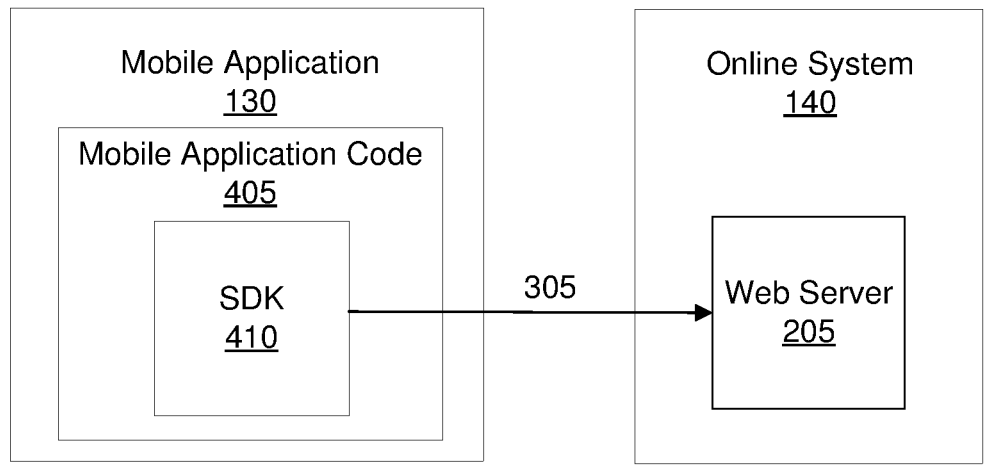
FIG. 4 is an example of receiving information describing an event occurring in a mobile application at an online system via an SDK incorporated into mobile application code of the mobile application, in accordance with an embodiment.

The online system 140 receives 305 (e.g., using the web server 205) information describing an event occurring in a mobile application 130. As shown in the example of FIG. 4, the information describing the event may be received 305 at the online system 140 via an SDK 410 that is incorporated into the mobile application code 405 of the mobile application 130. The event occurring in the mobile application 130 may correspond to a user action performed in the mobile application 130 (e.g., a subscription to a service in the mobile application 130, a purchase made in the mobile application 130, etc.). The information received 305 at the online system 140 describing the event may include a description of the event occurring in the mobile application 130. In some embodiments, the information received 305 at the online system 140 describing the event may include natural language text (e.g., in a string data type). The information received 305 at the online system 140 describing the event also may include user identifying information associated with a user of the mobile application 130 associated with the event (e.g., a user of the mobile application 130 who performed an action in the mobile application 130 corresponding to the event). Examples of user identifying information include a unique identifier associated with the user of the mobile application 130 (e.g., a username or an email address associated with the user) or any combination of information associated with the user of the mobile application 130 that may be used to identify the user (e.g., a first name, a last name, and an IP address associated with the user).

In addition to the description of the event occurring in the mobile application 130 and the user identifying information associated with the user of the mobile application 130, the information received 305 at the online system 140 describing the event also may include additional types of information. In some embodiments, the information received 305 at the online system 140 describing the event also may include metadata (e.g., semi-structured data) associated with the event occurring in the mobile application 130 (e.g., a tag or other metadata identifying an object associated with the event). In various embodiments, the information received 305 at the online system 140 describing the event also may include contextual information associated with the mobile application 130 and/or the event (e.g., a deep link that launches the mobile application 130 or information indicating an intent to perform a user action corresponding to the event occurring in the mobile application 130).

Referring back to FIG. 3, the online system 140 may then process 310 (e.g., using the processing module 210) the information received 305 at the online system 140 describing the event occurring in the mobile application 130. In embodiments in which the information received 305 at the online system 140 describing the event includes natural language text, the online system 140 may process 310 the information received 305 from the mobile application 130 using a natural language processing technique (e.g., using a natural language understanding (NLU) algorithm). For example, the online system 140 may process 310 natural language text included in information received 305 at the online system 140 by parsing the text, stemming or performing a lemmatization of each word included in the text, tagging portions of the text based on their corresponding part-of-speech, detecting a language of the text, translating the text into another language, identifying semantic relationships between words included in the text, etc.

The online system 140 also may identify 315 (e.g., using the event identification module 215) one or more types of events capable of occurring in the mobile application 130. The online system 140 may identify 315 the types of events based on information describing the mobile application 130 included among information received 305 at the online system 140 from the mobile application 130. The online system 140 also may identify 315 the types of events based on information maintained in the online system 140 (e.g., in the event store 220) describing types of events capable of occurring in one or more mobile applications 130 or in one or more types of mobile applications 130 (e.g., mobile gaming applications, mobile shopping applications, etc.). In some embodiments, a type of event capable of occurring in the mobile application 130 may correspond to a user action performed in the mobile application 130 by the user of the mobile application 130 (e.g., a status update to a user profile of the user of the mobile application 130). Examples of types of events capable of occurring in the mobile application 130 include completing a registration process, subscribing to a membership or a service, purchasing a good or a service, adding payment information, initiating a checkout, using a credit, reserving a good or a service, adding an item to a cart, or any other suitable types of events capable of occurring in a mobile application 130.

The online system 140 then determines 320 (e.g., using the event determination module 225) whether the description of the event occurring in the mobile application 130 included among the information received 305 at the online system 140 corresponds to information maintained in the online system 140 (e.g., in the event store 220) describing types of events capable of occurring in the mobile application 130. The online system 140 may make this determination by comparing the description of the event to the information maintained in the online system 140. For example, the online system 140 may compare a natural language description of the event occurring in the mobile application 130 to a list of natural language descriptions of different types of events that are capable of occurring in the mobile application 130 maintained in the online system 140 and determine 320 whether the natural language description matches any description in the list based on the comparison.

In embodiments in which the online system 140 determines 320 that the description of the event corresponds to information maintained in the online system 140 describing a type of event capable of occurring in the mobile application 130, the online system 140 logs 325 (e.g., using the event logger 230) the type of event in association with the user identifying information associated with the user of the mobile application 130 (e.g., in the event log 235). In some embodiments, the online system 140 may log 325 this information in conjunction with metadata and/or contextual information associated with the event received 305 at the online system 140 from the mobile application 130.

In embodiments in which the online system 140 determines 320 that the description of the event occurring in the mobile application 130 does not correspond to information maintained in the online system 140 describing a type of event capable of occurring in the mobile application 130, the online system 140 predicts 330 (e.g., using the prediction module 240) a type of event corresponding to the event occurring in the mobile application 130. The online system 140 may make the prediction based at least in part on information describing the event received 305 at the online system 140 from the mobile application 130. In some embodiments, the online system 140 also may predict 330 the type of event corresponding to the event occurring in the mobile application 130 based on data associated with events that previously occurred in one or more mobile applications 130. Data associated with an event that previously occurred in a mobile application 130 may include a description of the event (e.g., a string data type including natural language text describing the event), metadata associated with the event, contextual information associated with the event, and information indicating the type of event.

Figure 5:
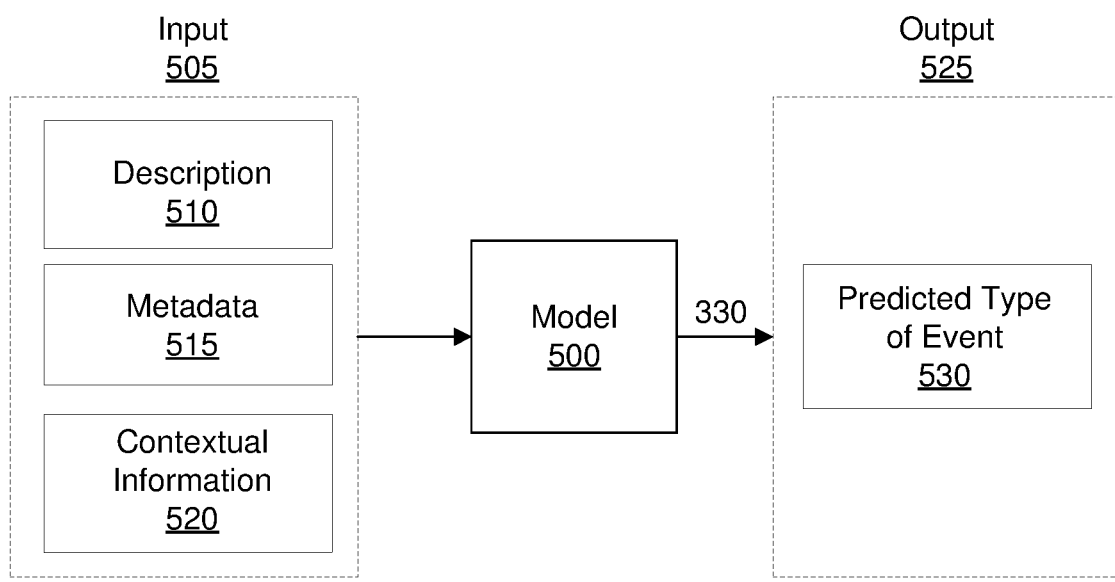
FIG. 5 is an example of predicting a type of event corresponding to an event occurring in a mobile application using a machine-learning model, in accordance with an embodiment.

In various embodiments, the online system 140 may predict 330 the type of event corresponding to the event occurring in the mobile application 130 using a machine-learning model that is trained based at least in part on the data associated with events that previously occurred in one or more mobile applications 130. For example, as shown in FIG. 5, suppose that a machine-learning model 500 is trained using data associated with events that previously occurred in multiple mobile applications 130. In this example, the online system 140 may provide an input 505 to the machine-learning model 500, in which the input 505 corresponds to the information received 305 at the online system 140 from the mobile application 130 describing the event occurring in the mobile application 130, such as the description 510 of the event, metadata 515 associated with the event, and contextual information 520 associated with the event. Continuing with this example, based on the input 505, the machine-learning model 500 may predict 330 a type of event corresponding to the event occurring in the mobile application 130 and generate an output 525 corresponding to the predicted type of event 530.

In embodiments in which the online system 140 predicts 330 the type of event corresponding to the event occurring in the mobile application 130 using a machine-learning model 500, the online system 140 may train the machine-learning model 500 (e.g., using the machine-learning module 245) using data associated with events that previously occurred in one or more mobile applications 130. In such embodiments, for each event that previously occurred, information indicating the type of event described may correspond to a label. In some embodiments, data associated with an event that previously occurred in a mobile application 130 may be labeled manually with the type of event described by the data.

In embodiments in which the online system 140 trains a machine-learning model 500 that is used to predict 330 the type of event corresponding to the event occurring in the mobile application 130, data used to train the model 500 may include a set of keywords extracted by the online system 140 from information describing events that previously occurred in one or more mobile applications 130. In various embodiments, the keywords may correspond to attributes for each instance of the training data. In embodiments in which the online system 140 extracts a set of keywords from information describing events that previously occurred in one or more mobile applications 130, the online system 140 may extract the keywords based at least in part on a weighting scheme (e.g., tf-idf).

In some embodiments, the online system 140 may predict 330 the type of event corresponding to the event occurring in the mobile application 130 using a set of rules generated by the online system 140 (e.g., using the rule generator 250). The set of rules may map keywords extracted (e.g., using a tf-idf weighting scheme) from data associated with events that previously occurred in one or more mobile applications 130 to various types of events. For example, suppose that a first rule stored in the online system 140 (e.g., in the rule store 255) maps a set of keywords, such as "add," "added," "adding," "cart," and "shopping," to a type of event, such as adding an item to a shopping cart and that a second rule stored in the online system 140 maps a different set of keywords, such as "account," "create," "created," and "creating," to another type of event, such as creating an account in a mobile application 130. In this example, if the event occurring in the mobile application 130 is described as "user created account in mobile application," based on the second rule and keywords included in the description (i.e., "created" and "account"), the online system 140 may predict 330 the type of event occurring in the mobile application 130 to be creating an account in the mobile application 130.

Referring once more to FIG. 3, in embodiments in which the online system 140 predicts 330 the type of event corresponding to the event occurring in the mobile application 130, the online system 140 logs 335 (e.g., using the event logger 230) the predicted type of event in association with the user identifying information associated with the user of the mobile application 130 associated with the event (e.g., in the event log 235). In some embodiments, the online system 140 also may log 335 this information in conjunction with metadata and/or contextual information associated with the event received 305 at the online system 140 from the mobile application 130 (e.g., a time at which the event occurred, an identifier associated with the mobile application 130, information describing a geographic location of a client device 110 used by the user to access the mobile application 130 at the time that the event occurred, a deep link used by the user to launch the mobile application 130, etc.).

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    accessing, at an online system, an event datastore describing one or more types of events occurring in one or more mobile applications, the event datastore including at least first text describing a first type of event in the one or more types of events;
    receiving, at the online system, a set of information comprising a description of an event occurring in a mobile application and user identifying information associated with a user of the mobile application associated with the event, the set of information received via a software development kit (SDK) incorporated into mobile application code of the mobile application, wherein the description of the event occurring in the mobile application includes second text describing a type of the event that is different from the first text;
    extracting a set of keywords from the set of information for the event, the set of keywords including at least keywords extracted from the second text;
    determining whether the description of the event corresponds to information maintained in the online system describing the one or more types of events;
    responsive to determining that the description of the event does not correspond to information maintained in the online system describing any of the one or more types of events, predicting an event type corresponding to the event occurring in the mobile application by applying a machine-learning model or a set of rules to at least the extracted set of keywords for the event, the predicted event type indicating that the event is of the first type; and
    logging, in the event datastore, the event as the first type of event in association with the user identifying information associated with the user of the mobile application.

2. The method of claim 1, wherein the set of information includes one or more of metadata and contextual information associated with the event occurring in the mobile application, wherein the event is logged in conjunction with the one or more of the metadata and the contextual information associated with the event occurring in the mobile application.

3. The method of claim 2, wherein the contextual information comprises one or more selected from a group consisting of: a time at which the event occurred, an identifier associated with the mobile application, information describing a geographic location of a client device used by the user to access the mobile application at the time that the event occurred, a deep link used by the user to launch the mobile application, and any combination thereof.

4. The method of claim 1, further comprising:
    training the machine-learning model based at least in part on a set of training data comprising information describing a plurality of events that previously occurred in one or more mobile applications, metadata associated with the plurality of events, contextual information associated with the plurality of events, and a label identifying a type of event associated with each of the plurality of events.

5. The method of claim 4, wherein the set of training data comprises a training set of keywords extracted from one or more of: the information describing the plurality of events that previously occurred in the one or more mobile applications, the metadata associated with the plurality of events, and the contextual information associated with the plurality of events.

6. The method of claim 5, wherein the training set of keywords are extracted based at least in part on a term frequency-inverse document frequency weighting scheme applied to one or more of: the information describing the plurality of events that previously occurred in the one or more mobile applications, the metadata associated with the plurality of events, and the contextual information associated with the plurality of events.

7. The method of claim 1, further comprising:
extracting a second set of keywords from data associated with a plurality of events that previously occurred in one or more mobile applications based at least in part on a term frequency-inverse document frequency weighting scheme; and
generating the set of rules mapping one or more subsets of the set of keywords to the one or more types of events.

8. The method of claim 7, wherein predicting the type of event corresponding to the event occurring in the mobile application is further based at least in part on the set of rules.

9. The method of claim 1, wherein the second text in the set of information received at the online system comprises natural language text.

10. The method of claim 9, further comprising:
processing the set of information received at the online system using a natural language processing technique.

11. The method of claim 1, wherein the one or more types of events capable of occurring in the mobile application are selected from the group consisting of: completing a registration process, subscribing to a membership, subscribing to a service, purchasing a good, purchasing a service, adding payment information, initiating a checkout, using a credit, reserving a good, reserving a service, and any combination thereof.

12. A computer program product comprising a computer readable storage medium having instructions encoded thereon that, when executed by a processor, cause the processor to:
access, at an online system, an event datastore describing one or more types of events occurring in one or more mobile applications, the event datastore including at least first text describing a first type of event in the one or more types of events;
receive, at the online system, a set of information comprising a description of an event occurring in a mobile application and user identifying information associated with a user of the mobile application associated with the event, the set of information received via software development kit (SDK) incorporated into mobile application code of the mobile application, wherein the description of the event occurring in the mobile application includes second text describing a type of the event that is different from the first text;
extract a set of keywords from the set of information for the event, the set of keywords including at least keywords extracted from the second text;
determine whether the description of the event corresponds to information maintained in the online system describing one or more types of events;
responsive to determining that the description of the event does not correspond to information maintained in the online system describing any of the one or more types of events, predict an event type corresponding to the event occurring in the mobile application by applying a machine-learning model or a set of rules to at least the extracted set of keywords for the event, the predicted event type indicating that the event is of the first type; and
log, in the event datastore, the event as the first type of event in association with the user identifying information associated with the user of the mobile application.

13. The computer program product of claim 12, wherein the set of information includes one or more of metadata and contextual information associated with the event occurring in the mobile application, wherein the event is logged in conjunction with the one or more of the metadata and the contextual information associated with the event occurring in the mobile application.

14. The computer program product of claim 13, wherein the contextual information comprises one or more selected from a group consisting of: a time at which the event occurred, an identifier associated with the mobile application, information describing a geographic location of a client device used by the user to access the mobile application at the time that the event occurred, a deep link used by the user to launch the mobile application, and any combination thereof.

15. The computer program product of claim 12, wherein the computer readable storage medium further has instructions encoded thereon that, when executed by the processor, cause the processor to:
train the machine-learning model based at least in part on a set of training data comprising information describing a plurality of events that previously occurred in one or more mobile applications, metadata associated with the plurality of events, contextual information associated with the plurality of events, and a label identifying a type of event associated with each of the plurality of events.

16. The computer program product of claim 15, wherein the set of training data comprises a training set of keywords extracted from one or more of: the information describing the plurality of events that previously occurred in the one or more mobile applications, the metadata associated with the plurality of events, and the contextual information associated with the plurality of events.

17. The computer program product of claim 16, wherein the training set of keywords are extracted based at least in part on a term frequency-inverse document frequency weighting scheme applied to one or more of: the information describing the plurality of events that previously occurred in the one or more mobile applications, the metadata associated with the plurality of events, and the contextual information associated with the plurality of events.

18. The computer program product of claim 12, wherein the computer readable storage medium further has instructions encoded thereon that, when executed by the processor, cause the processor to:
extract a set of keywords from data associated with a plurality of events that previously occurred in one or more mobile applications based at least in part on a term frequency-inverse document frequency weighting scheme; and
generate the set of rules mapping one or more subsets of the set of keywords to the one or more types of events.

19. The computer program product of claim 18, wherein predict the type of event corresponding to the event occurring in the mobile application is further based at least in part on the set of rules.

20. The computer program product of claim 12, wherein the second text in the set of information received at the online system comprises natural language text.

21. The computer program product of claim 20, wherein the computer readable storage medium further has instructions encoded thereon that, when executed by the processor, cause the processor to:
process the set of information received at the online system using a natural language processing technique.

22. The computer program product of claim 12, wherein the one or more types of events capable of occurring in the mobile application are selected from the group consisting of: completing a registration process, subscribing to a membership, subscribing to a service, purchasing a good, purchasing a service, adding payment information, initiating a checkout, using a credit, reserving a good, reserving a service, and any combination thereof.

23. A method comprising:

accessing, at an online system, an event datastore describing one or more types of events occurring in one or more mobile applications, the event datastore including at least first text describing a first type of event in the one or more types of events;

receiving, at the online system, a set of information comprising a description of an event occurring in a mobile application, the set of information received via a software development kit (SDK) incorporated into mobile application code of the mobile application, wherein the description of the event occurring in the mobile application includes second text describing a type of the event that is different from the first text;

extracting a set of keywords from the set of information for the event, the set of keywords including at least keywords extracted from the second text;

determining whether the description of the event corresponds to information maintained in the online system describing one or more types of events;

responsive to determining that the description of the event does not correspond to information maintained in the online system describing any of the one or more types of events, predicting an event type corresponding to the event occurring in the mobile application by applying a machine-learning model or a set of rules to at least the extracted set of keywords for the event, the predicted event type indicating that the event is of the first type; and logging, in the event datastore, the event as the first type of event in association with a subset of the set of information received at the online system.

24. The method of claim 1, wherein receiving a set of information further comprises:

receiving, at the online system, a second set of information comprising a description of an event occurring in a mobile application and user identifying information associated with a user of a second mobile device, the second set of information received via a software development kit (SDK) incorporated into mobile application code from the second mobile device, wherein the description of the event occurring in the second mobile device includes a third text describing a type of the event that is different than the first text.

\* \* \* \* \*